United States Patent
Harte et al.

[11] 3,792,272
[45] Feb. 12, 1974

[54] BREATH TEST DEVICE FOR ORGANIC COMPONENTS, INCLUDING ALCOHOL

[75] Inventors: Richard A. Harte, Redwood City; Edwin A. Amstutz, Santa Clara; Achille M. Bigliardi, III, San Jose; William M. Johnson, Palo Alto, all of Calif.

[73] Assignee: Omicron Systems Corporation, Palo Alto, Calif.

[22] Filed: Jan. 12, 1973

[21] Appl. No.: 323,295

Related U.S. Application Data

[63] Continuation-in-part of Ser. No. 212,522, Dec. 27, 1971, abandoned.

[52] U.S. Cl. ............... 250/343, 250/338, 250/339, 250/340
[51] Int. Cl. ............................................. G01n 21/26
[58] Field of Search ....... 250/43.5 R, 343, 338, 339, 250/340

[56] References Cited
UNITED STATES PATENTS

| | | | |
|---|---|---|---|
| 3,562,524 | 9/1971 | Moore | 250/43.5 R |
| 3,449,565 | 6/1969 | Barringer | 250/43.5 R |
| 3,700,890 | 10/1972 | Kruezer | 250/43.5 R |
| 3,662,171 | 5/1972 | Brengman | 250/43.5 R |
| 3,632,212 | 1/1972 | Dermal | 250/43.5 R |
| 3,614,243 | 10/1971 | Harvey | 250/43.5 R |

*Primary Examiner*—James W. Lawrence
*Assistant Examiner*—B. C. Anderson
*Attorney, Agent, or Firm*—Owen, Wickersham & Erickson

[57] ABSTRACT

A system for detecting volatile components in a vapor, e.g., alcohol, in the breath of a human subject. A ray of frequency-modulated and collimated light of suitable near infrared wavelength from a source such as a laser or a quartz-halogen lamp, collimated with quartz lenses and appropriate optical interference filters passes through the vapor sample via a path of fixed length and free from light losses except those caused by the volatile components being detected, and strikes a radiant energy detector, setting up an electrical signal which is amplified, electronically processed, filtered, and displayed. The concentration of alcohol or other test vapor affects the amount of energy able to pass through the sample to the detector. The detector determines the energy absorbed by the sample and transmits the result to a readout device, meter, or permanent recording means. The sample can be collected by taking an alveolar (deep lung) sample of the subject's breath. The system determines, through Henry's law, the blood content of alcohol, ketones, aldehydes, various anesthesias and the like. This system is also applicable to determine combustible gases, for example, in coal mines.

20 Claims, 5 Drawing Figures

BREATH TEST DEVICE FOR ORGANIC COMPONENTS, INCLUDING ALCOHOL

CROSS-REFERENCE TO RELATED APPLICATION

This application is a continuation-in-part of application Ser. No. 212,522, filed Dec. 27, 1971 now abandoned.

BACKGROUND OF THE INVENTION

This invention relates to the quantitative determination of various volatile components in a vapor. For example, it can evaluate the amount of alcohol in a person's breath.

This invention is applicable to an alcohol meter for determining blood alcohol level, to a blood toxicology detector, to a methane gas detector, to a diabetic-ketone breath detector, to an anesthesia detector, and to an anesthesia monitor (ether, chloroform, halothane, cyclopropane, ethylene, etc.), among other things.

The field of drunk-driving arrests has become a testing ground where the rights of the individual who wishes to drink and drive are balanced against the protection of society, which is subjected annually to 30,000 deaths, 100,000 maimings, and untold millions of dollars worth of property damage in alcohol-involved auto accidents. In attempting stricter law enforcement on the roads and highways, many states have enacted "implied consent" laws, making the driver's license a privilege and not a right, to be forfeited on refusal of the suspect to take a blood, breath, or urine alcohol test. More and more states have set legal blood alcohol intoxication concentrations which serve as prima facie evidence of drunk driving. These concentrations, varying generally from 0.1 percent to 0.15 percent w/v have been challenged by some legislators and scientists as too high, allowing some who are drunk and deserve punishment to escape the consequences of their acts. Evidence is mounting from scientific studies on judgement impairment, that 0.07 percent or 0.08 percent might be a more logical level.

With the requirement that the innocent be protected, a burden has fallen on local law enforcement agencies to prove their cases. Scientific equipment for alcohol detection has become a necessary tool, but it has also become a burden to the police, because it must be shown in court that the instruments are invariably accurate, sensitive, reliable, rugged, tamperproof, and beyond all reproach at the time of use. Heretofore, practical quantitative alcohol monitors have employed classical wet-chemistry techniques. The blood, urine, or breath sample has been subjected to an oxidation-reduction reaction while combining the alcohol with an acid solution of a strongly colored oxidizer like potassium dichromate or permanganate. The degree of color change in the solution indicates the degree of reduction and, therefore, the amount of alcohol present in a fixed quantity of sample. Such tests are acceptably accurate, but are an indirect indication of the alcohol present. Chemical tests are costly because of the necessarily expendable reagents. They are difficult to handle because of the corrosive nature of the concentrated sulfuric acid involved. They are complex because of the number of steps required, and, therefore, require special training. They are slow because of the reaction time of the chemical changes.

It is desirable, therefore, to provide a means or device for quickly or immediately determining blood alcohol content in a suspected drunk driver quickly, and on the site. Moreover, the information so provided should be accurate within accepted legal standards.

It is also desirable to be able to determine at the site, and quickly, other pollutants or substances, for example, methane in mine gases, ketones of diabetic patients, hydrocarbons as pollutants in automobile exhaust gases, gaseous anesthetic levels in breath, e.g., when administered as chloroform, $CH Cl_3$, or ether, $C_2H_5OC_2H_5$, Haldane, cyclopropane and other anesthetics containing methyl (C-H) vibrations.

The present invention provides such an analysis system for the substances described, and it can be employed in determining blood alcohol content of a suspected drunk driver rapidly and accurately without chemicals. Also, the analysis can be done by a portable unit which can be carried in a squad car. The analysis can be performed immediately, and on the spot, to give an immediate, accurate result, avoiding changing of the suspect's condition or the condition of samples taken by other methods, between the stopping of the suspect and the determination of the test results. Moreover, the results are printed out in a hard copy. Also, immediate accurate determination of methane in gases, diabetic ketones, hydrocarbon pollutants and gaseous anesthetics, as described above, is enabled by the present invention.

The above and other objects and advantages are attained by the present invention, as will become apparent from the description which follows.

The present invention operates on the principle of the absorption by alcohol and other materials of energy from a beam of infrared electromagnetic energy. In this it is not unique. For example, infrared energy absorption has been used in determining breath alcohol in the technique described in U. S. Pat. No. 3,562,524 issued Feb. 9, 1971 to Donald F. Moore. However, there are so many differences between the present invention and that disclosed by Moore that a brief discussion is in order.

Moore, in U.S. Pat. No. 3,562,524, utilizes a long infrared wavelength (9.2 microns) lying in the far infrared and specific to ethanol. Therefore, Moore cannot detect ketones, methane, or various anesthesias which the present invention can detect. Moreover, because of using this long infrared wavelength, Moore must have a light source such as a hot wire, a globar source, or a nernst glower, and in conjunction with this light source, Moore uses a thermal detector, a balemeter, which is incapable of rapid modulation.

In contrast, the present invention utilizes a short infrared wavelength, such as 3.39 microns lying in the near infrared wavelength and able to detect not only ethanol but also ketones, methane, and various anesthesias, for example. Furthermore, the present invention is able to utilize light sources such as a helium-neon laser source, or quartz iodine or other quartz halide lamps which Moore cannot use, since quartz will not transmit its energy at wavelengths beyond 4 microns.

Moreover, the present invention employs rapid light modulation between 100 and 800 Hertz (e.g., 330 Hertz) of the light source—a very important feature of the invention, since regulated modulation at frequencies distant from multiples of the line stage of alternating current, enable accurate electronic filtering so that most electronic "noise" or interferences can be removed. Hence, the present device is not subject to 1/F (low frequency) noise. This would be impossible with a thermal detector, such as Moore uses; so the present invention employs a highly sensitive photoconductive transducer—which is also far more sensitive than Moore's thermal sensor.

Another vital distinction is that the present device employs an optical path of fixed length (e.g., 270 cm) and of a type that eliminates light losses, except those due to the material being tested for. For example, a preferred embodiment of this invention uses spherical mirrors to re-focus the energy after each bounce in the sample source. Hence, all of the infrared energy which enters the sample cell leaves the sample cell except that energy which is absorbed by alcohol vapor or other vapor being measured. With a fixed path length and with light energy lost only to infrared absorption, the invention operates in strict obedience to the Lambert-Beer Law, described below.

In contrast, Moore utilizes an integrating sphere, so that some of the infrared energy entering his sphere reaches his thermal detector after a short trip, with few bounces against the wall, while other infrared energy travels much further. His sphere thus provides no fixed path length for the infrared energy, and a number of different lengths are actually traveled. Furthermore, since no diffuse surface is a perfect reflector, the many bounces in Moore's sphere result in light loss due to wall absorption as well as to absorption by alcohol. As a result, the Moore device has to be calibrated empirically. The Moore device cannot be calibrated by the Lambert-Beer Law. Moreover, Moore uses optical calibration, and that has been determined as unacceptable by the courts, which demand calibration by use of alcohol vapor standards, as in the present invention.

Another significant difference is that Moore requires two beams—a reference beam and a sample beam—, while the present invention obtains its results with a single-beam system.

In addition, the present invention provides a number of supplemental features absent from the Moore device, including a tamper-proof zero set, printed hard copy for evidence, and tamper-proof operation.

SUMMARY OF THE INVENTION

This invention relates to the analysis of breath or other gaseous admixtures to determine quickly and accurately the amount of a given carbon-hydrogen compound therein which is present as vapor or gas in such admixture at ambient temperature or at less than 100° C. In a particular manner, the invention relates to the determination of blood alcohol level in a suspected drunk driver by analysis of a breath sample.

According to the invention, there is provided a system for the analysis of a gas mixture to determine the presence and quantitative amount of a given carbon-hydrogen compound therein. The system comprises a receptacle to contain a gas mixture raised to a fixed temperature at which it is thermostatically maintained, a source of near infrared light radiation or radiant energy of selected wavelength depending upon the energy-absorption characteristics of the substance to be detected or determined, means for stabilizing the radiant energy output, means for modulating the light at a selected frequency, means to collimate and direct such energy along a predetermined, desired path within the receptacle, means for introducing the gas sample to be analyzed, means for determining the correct volume of gas for analyses, means for keeping this gas at constant temperature and constant pressure, means for directing the radiant energy passing through the gas on to the face of a sensitive infrared photoconductive transducer, and means for amplifying and processing the resulting electrical signal such that it activates an appropriate display and reads out accurately the quantitative level of the gas present in the sample cell. Finally, the invention includes means for deactivating the process unless the appropriate operating steps are taken.

The source of light or radiant energy is selected or operated so as to be highly stable and to produce energy of a selected wavelength in the near infrared range. For example, in a system to determine blood alcohol level in a subject it is desirable to use an energy source of 3.39 microns wavelength because ethanol exhibits very strong absorption of infrared light rays at this wavelength, and other components of a breath mixture are relatively transparent to this wavelength, so that the reading is a reliable report of the amount of such alcohol present. Other wavelengths of near infrared energy may be selected as necessary to coincide with peak absorption of a particular substance to be determined, e.g., ether, methane, ketones, automobile exhaust pollutants or other substances known or suspected.

The present invention is an infrared analyzer which uses no chemicals. It measures a physical property—the absorption of infrared energy by a gas, following the well-known Lambert-Beer Law of Absorption, $$I = I_0 e^{-kabc}$$

where, for alcohol,

I is the energy emerging from the gas absorption cell, $I_o$ is the incident energy entering the gas absorption cell, e is the natural logarithm base k is a constant which converts the breath concentration to the blood alcohol level a is the absorption coefficient for ethyl alcohol at the wavelength in question, which is 3.39 microns b is the length of the light path in the gas absorption cell, and c is the concentration of alcohol in the breath.

Since $I/I_o$ is measured by the instrument, and since k, a and b are all constants, c (the concentration) is readily determinable.

The invention, when used for alcohol, operates at an infrared wavelength which coincides with a major absorption band of ethyl alcohol, namely, 3.39 microns, representative of C-H stretching molecular bond vibrations. Infrared light from a highly stabilized source is modulated at a frequency such as 330 Hertz, then collimated by fused silica lenses, and directed through a specially designed sample cell. At the other end of the cell, a second set of fused silica optics focus the energy onto the face of a sensitive infrared photoconductor. The use of spherical concave mirrors enables multipass reflections to provide a long path length in a small package and without light loss.

As the concentration of alcohol vapor increases in the cell, the amount of infrared energy reaching the detector falls in a predictable, exponential manner. The sample cell is kept heated to remove moisture condensate from the optics and to prevent loss of alcohol in the condensate. The signal detected is electronically filtered at the source modulation frequency, and then is processed through a high gain, high sensitivity, low noise circuit and converted from an AC to a DC signal. This DC analogue signal, which is a representation of the exponential relationship between the energy transmitted through the cell and the concentration of alcohol in the cell, is linearized by a signal processing unit, and then passed through an analogue-to-digital converter, and displayed on a three-digit panel meter directly as percent blood alcohol. A printer is then actuated to provide a hard copy of the readout.

The conversion to percent blood alcohol is based upon the established principle that, by Henry's Law, 2,100 cc of "substantially alveolar breath" sample contains the equivalent weight of alcohol of that found in 1 ml of pulmonary arterial blood.

Since many jurisdictions may eventually use the direct breath alcohol content rather than the conversion to a calculated blood concentration, it is a relatively simple matter to have the instrument provide the reading to indicate the alcohol per unit volume of breath.

The operating procedure involves a simple four-step operation, viz:

1 a "zero set" adjustment, 2 an air blank is pumped into a sample cell with either an external hand bulb or an internal pump that is used to clear the cell after each test, recording the air blank reading with a digital printer, 3 one or more subject breath readings is taken, followed by the digital printout of this value, 4 a reference sample, such as a laboratory-prepared equilibrator vapor is provided, followed by the recording of this value with the digital printer.

This instrument employs an oven which brings the sample cell to 55° C. temperature and thermostatically regulates it to ± 1° C. within 10 minutes after turn-on. Since most state laws specifically require a 15-minute period of deprivation (no drinking, smoking or eating) between the time of apprehension and breath testing, the 10-minute warm-up time from a cold start presents no operational problem. Slight variations in mouth temperature do not appear to affect the results.

The results of the tests are printed on an IBM-format card with one hard copy and two "soft" pressure sensitive copies. One copy can be given to the subject at the time of the test, and the other two retained for use by the law-enforcement agency and/or the court.

The use of an interlock device in the zero adjust knob, makes it impossible to operate the device when the knob is engaged. Breaking the interlock automatically locks out the printer and lights on error lamp. A sequence of readings showing a 0.00 percent w/v value for the air blank, followed by the breath and reference readings free of any sign that the interlock has been broken insures a tamper-proof set of readings.

The instrument's power requirements are such that operation in a squad car, off a car battery, is feasible. The device is rugged enough for use in a police van or in a squad car for on-site testing in the field. It is also capable of reading samples brought from the field in balloons.

Among the major features of the invention are that it provides direct measurement of blood alcohol and gives a quick and conclusive answer. It eliminates laboratory analysis, and no acid ampules are required, and there is no sampling cylinder. The cost per test is low, and it requires minimal operator training. Calibration is simplified and no chemicals are used. Permanent tamper-proof digital printout is provided in a rugged shock-proof design that is capable of routine vehicle use.

Among the features and advantages of the invention are the following:

1. It does not employ a chemical measurement. The physical laws of light absorption serve as its principle of operation, and they provide a direct method of measuring breath alcohol quantitatively.

2. The reading is almost instantaneous. As a gas absorption cell fills with breath, the detector reads the absorbance due to the presence of alcohol, and the quantity is converted to and presented as a blood alcohol concentration.

3. It is difficult to falsify the presentation of deep-lung air to the device. As long as the subject has not provided sufficient sample to fill the cell, the meter indicating blood alcohol concentration continues to rise. When the meter has reached its highest reading and remains there while the subject is still giving his breath sample, the operator is assured of a suitable deep-lung sample. In a sense, the gas cell must approach equilibrium with the originally deep-lung air, modified to the condition at which it is delivered at the mouth.

4. A clock mechanism acts in conjunction with a pressure valve to insure that no printout will occur unless and until a sufficient alveolar or deep-lung sample is provided.

5. No chemicals or other expendables are involved, other than the mouthpiece and the data card.

6. The operational procedure is extremely simple, so that little time need be spent in training and qualifying police and crime laboratory personnel in its use.

7. Tests have indicated that no other interferants which possess some degree of light absorption at this wavelength (methyl alcohol, certain ketones and aldehydes) will be detectable when present in even toxic blood concentrations of drivers.

8. The cell is open to ambient air; thus the volume in the cell is always the same at a given barometric pressure. Since the cell walls are kep at approximately 55° C. in temperature, condensation is avoided. The result of the analysis thus is independent of the barometric pressure existing when the subject delivers the breath specimen. The open system also does away with cylinders, pistons, and pressure switches, mechanical elements which occasionally break down in present equipment.

9. The readout is digital, and this reduces reading errors. The record is also printed for use in court. Furthermore, the printout is tamper-proof.

Other objects and advantages of the invention and some modes of carrying it out are illustrated by the description below, and also by the annexed drawings.

DETAILED DESCRIPTION OF THE INVENTION

Figure 1:
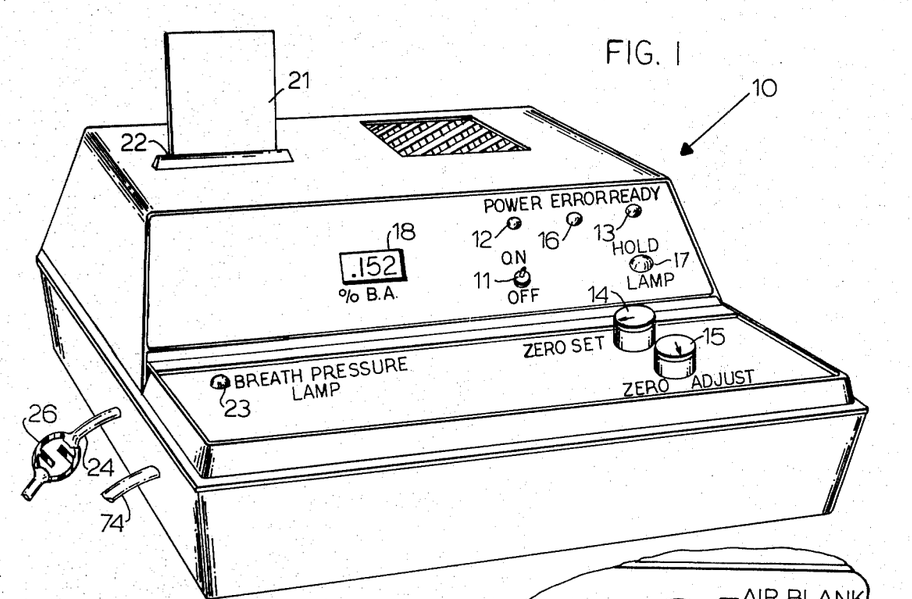
FIG. 1 is a view in perspective and partly in section of a device embodying the principles of this invention.
Figures 2, 3:
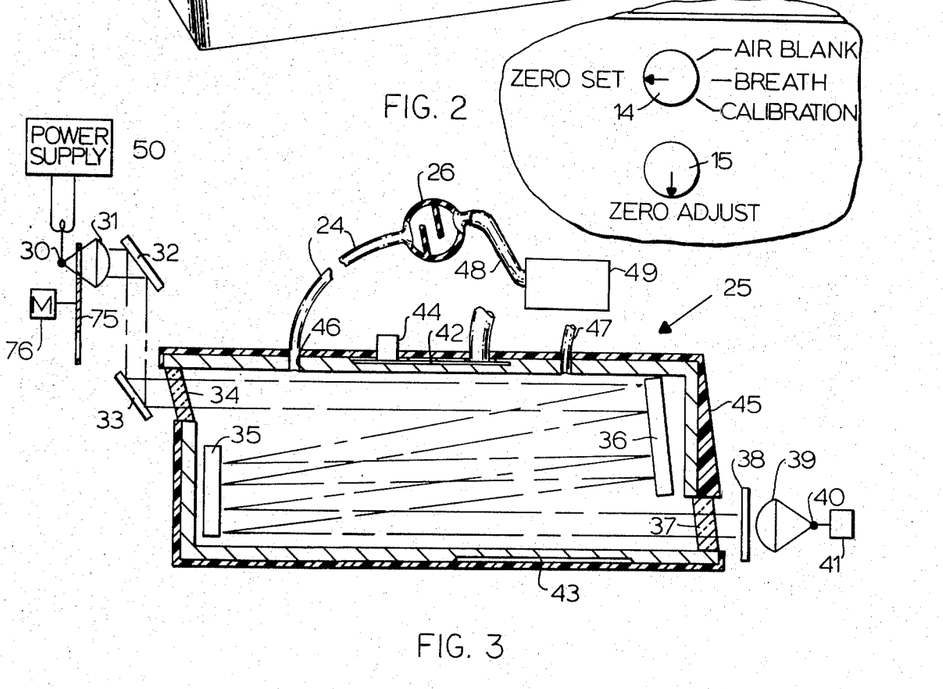
FIG. 2 is a fragmentary enlarged top plan view of a portion of FIG. 1.
FIG. 3 is a partly schematic diagram and partly sectional view of the device of FIG. 1.

FIG. 1 represents a device 10 embodying the present invention, wherein the blood alcohol content of a suspected drunk driver may be determined by analysis of the expired breath of the subject. The device 10 has an on/off power switch 11. When the switch 11 is raised to the "on" position, all of the instrument's functions are activated, as indicated by the lighting of an indicator light 12. A green ready light 13 lights up, generally within five minutes of throwing the switch 11, and indicates that the breath sampling cell has reached the required temperature of 55° C. and is being held there by thermostatic control. A mode selector switch 14 is manually switched to the desired test mode of "Zero Set," "Air Blank," "Breath Testing," and "Calibration." A zero adjust knob 15 is used to set the electronic "Zero" prior to any test. An error light 16 lights when the "zero adjust" knob 15 is not correctly set, or when the zero adjust knob is moved during the proper test sequence. A hold lamp 17 lights after a proper test and triggers the printer; it signals a "test complete" state. A digital panel meter 18 reads the amount of blood alcohol in the breath, or the equivalent blood alcohol in a simulator. The meter 18 may have three digits and may read in percent alcohol in blood or in grams per 100 ml. A card 21, which may be an IBM format, pressure-sensitive card with two soft copies and one hard copy, is slipped into the printer 20 via a card slot 22. A breath pressure indicator lamp 23 lights when the subject's breath is passing into the sample cell 25 (see FIG. 3) at a pressure insuring a deep lung sample. An electronic clock circuit or "print enable" circuit is actuated by the lamp 23 lighting and begins counting a predetermined interval, such as eleven seconds, after which it triggers a print pulse 72. A tygon plastic tube 24 carries the breath into the sample cell 25 and, when not in use, retracts into the heated interior to drive off any deposited moisture. At its end, the tube 24 carries a disposable plastic mouthpiece 26 which traps liquids in the breath. Referring now to FIG. 3, a lamp 30 sends a beam of near infrared energy through a modulator 75, which may be a rotating chopper wheel driven by a motor 76, the light beam is thereby interrupted at a constant predetermined frequency above 100 Hertz and below 800 Hertz and not a multiple of line-current frequency (e.g., 60 Hertz). For example, the modulation frequency may be 330 Hertz, as determined by the motor speed and the number of apertures in a rotating disk comprising the modulator. A portion of the modulated energy is collected by a quartz lens 31 which collimates it, and directs it, preferably via beam-steering mirrors 32 and 33 through a quartz window 34 and into the sample cell 25. There spherical segment mirrors 35 and 36 create a long optical path of fixed length; for example, there may be nine reflections giving a total length of 270 cm, and all the light travels this fixed length. Moreover, there is no light loss to the mirrors 35, 36 so that the only light energy lost in the sample cell 25 is that absorbed by the alcohol or other vapor being tested for. The beam then emerges from the quartz window 37 through an interference filter 38 which isolates 3.39 micron energy and is refocused by a quartz lens 39 on to an infrared photoconductor cell 40 which is then transduced to a voltage and processed in an electronics processor 41, shown in FIG. 4.

The breath sample cell 25 may be a metal box having an attached resistance heater 42, that brings the walls of a chamber 43 to 55° C. within a few minutes. A thermostat 44 controls the temperature to ± 1° C. at 55° C. Styrofoam or other insulation 45 may keep the heat in the cell walls and away from the detector 40. Two air inlet tubes 46 and 47 penetrate the walls of the breath sample cell 25. Breath from the mouthpiece 26 passes through the tubing 24 into the inlet tube 46 and then passes out the tube 47, keeping the internal pressure at ambient barometric pressure. To evacuate the cell 25 after a test, an air pump 49 is activated, pushing ambient room air in the unit through the tube 48, which is connected via the mouthpiece 26 to the inlet tube 24.

BLOCK DIAGRAM DESCRIPTION - OPTICAL AND ELECTRONIC:

The light source 30 is controlled by a highly stable, well-regulated power supply 50. The power supply 50 operates at +15 volts and 4.0 amps. The processing electronics (i.e., amplifiers, electronic filters, etc.) operate off the internal supply 50 of +15 volts at 100 milliamps and −15 volts at 100 milliamps. The digital electronics uses a source 52 of +5 volts at 200 milliamps as its power requirements.

Figure 4:
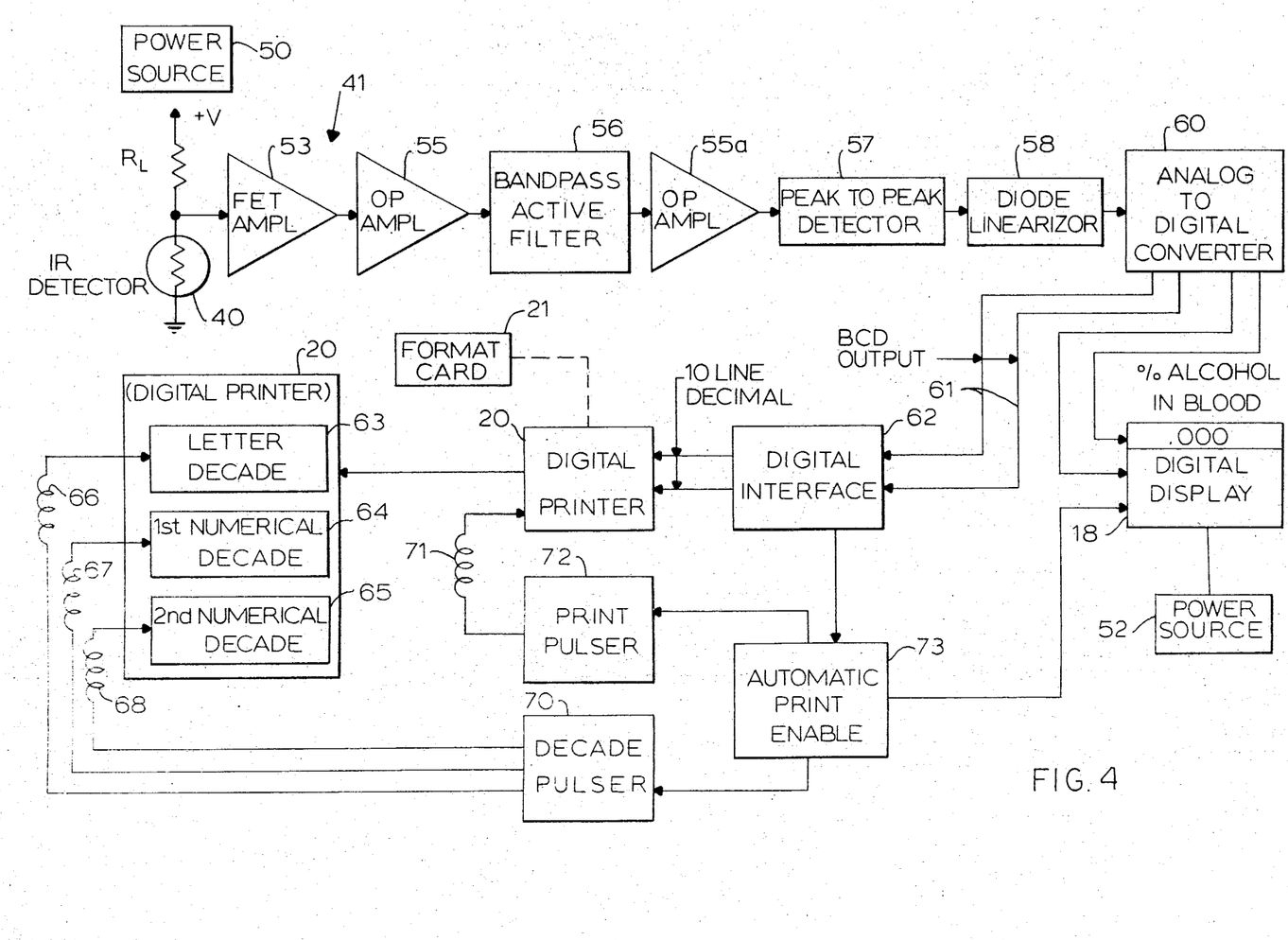
FIG. 4 is an electrical circuit diagram of the device of FIGS. 1 and 2, generally shown in block form.

An electronics block diagram is shown in FIG. 4. The modulated light signal is converted to an electrical signal by the detector 40. A very high input impedance of a FET (field-effect transistor) amplifier 53 acts as the detector load. The signal is then amplified by two stages of a stable low noise operational amplifier 55 and 55a. The signal-to-noise ratio is further enhanced by a series combination of bandpass filters 56 in between the two amplifier stages 55 and 55a and centered at the modulation frequency (e.g., 330 Hertz) and having a narrow band width (e.g., 2 Hertz or from 328 to 332 h). This AC signal is converted to a DC signal through a peak-to-peak detector 57 and linearized by the use of a four-step diode linearizer 58. The electronics is linearized in the region of 0.000 to 0.400 percent alcohol in blood.

The DC analog signal is converted by an analog-to-digital converter 60 to a digital signal which drives the display 18 on the front panel. The analog signal is proportional to percent alcohol in blood, and the digital display 18 gives a direct reading of percent alcohol in blood. The BCD (Binary Coded Decimal) output 61 of the analog-to-digital converter 60 is used to drive a digital interface 62 which converts the BCD output to ten line decimal for use by the printer 20.

The printer 20 may comprise three separate decades, 63, 64, and 65, one for the letters (A, B, C, and E) and two for the numerals (0–9). Each decade includes a small solenoid 66, 67, 68 which is driven by a decade pulser 70. The printer 20 itself contains one large solenoid 71 to print the informattion contained on the decades.

The decade pulser 70 drives the printer decades 63, 64, 65 when the breath cycle or the clearing of the sample cell is completed. The operator can hear the decades rotate until each decade is in coincidence with its display 18, at which time it stops rotating. The digital display 18 is also locked onto the reading it displays at the time when the decade pulser 70 is activated by the automatic print enable circuit 73.

The print pulse occurs after a short delay (e.g., one second) after the decade pulser 70 is activated. This pulse is initiated in the automatic print enable circuit 73 and is completed in a print pulser 72 that pulses the printer solenoid 71 which pulls the platen up to strike the format card 21 placed between the platen and the decade wheel.

If the operator does not operate the zero adjust set knob 14 properly, or if he pushes down on the zero adjust knob 15 in the test positions, the automatic print enable 73 turns on the error light 16, and the print solenoid 71 will not be activated to print on the format card 21. To unlock the automatic print enable circuit 73 from this mode, the operator has to turn the function switch 14 back to its zero set position.

Figure 5:
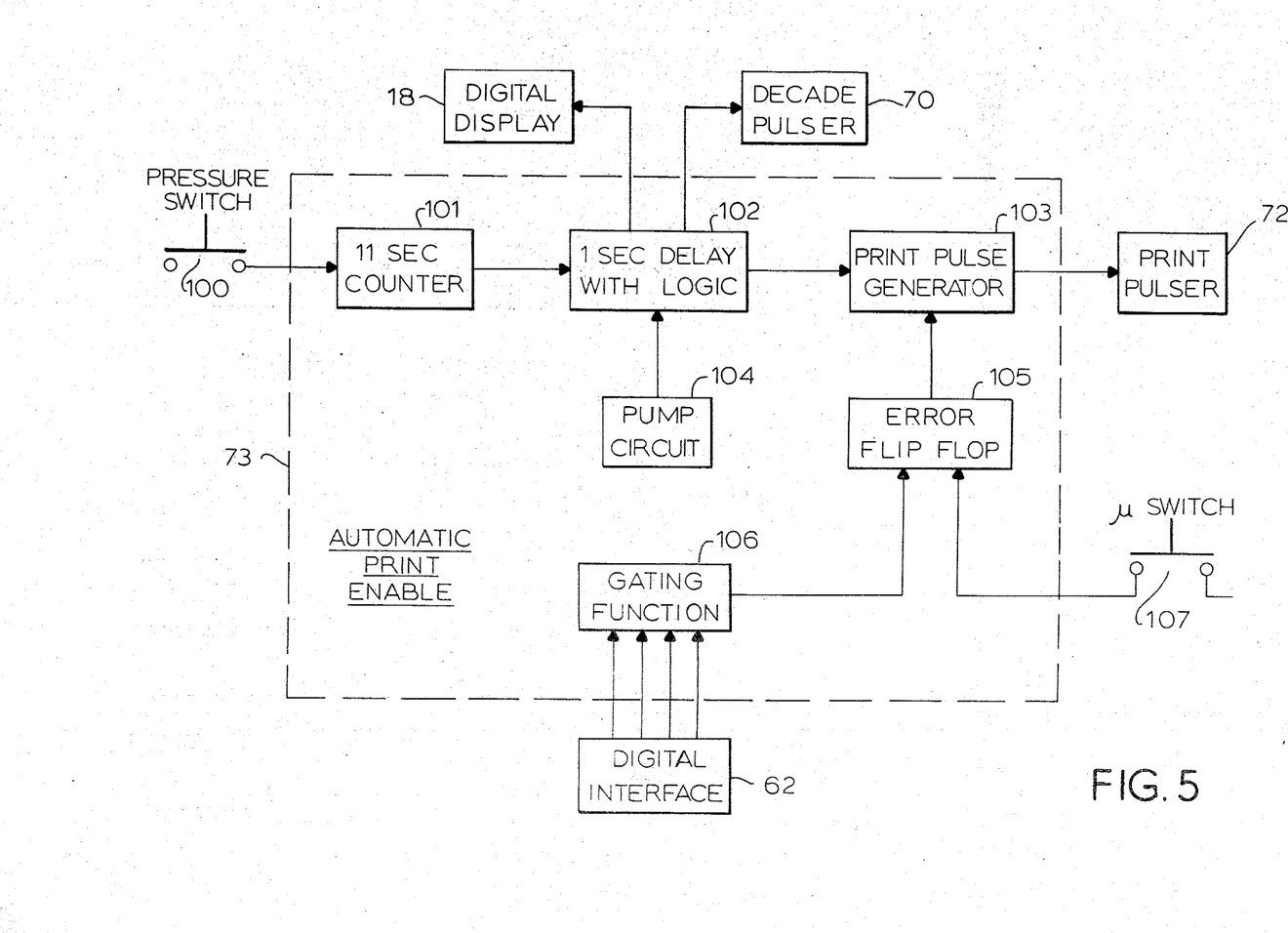
FIG. 5 is an electrical circuit diagram of the print-enabling circuit.

These fail-safe functions are performed by the automatic print enable device 73, which is shown in more detail in FIG. 5. The device 73 comprises a pressure switch 100 which actuates to a counter 101, which in turn actuates a device 102 which is best described as a device providing a 1-second delay with logic. This device 102 has an output leading to the digital display 18 and another output to the decade pulser 70. It also has an input from a pump circuit 104. The delay-with-logic 102 also actuates a print pulse generator 103, which has an output to the print pulser 72. The print pulse generator 103 has, in addition, an input from an error flip-flop 105 which itself has two inputs, one leading from a gating function 106 and the other from a microswitch 107. The gating function 106 receives its input from the digital interface 62, while the microswitch receives its input from the zero adjust switch 15.

When air at a minimum specified pressure is passed through the breath tube 24 and when the switch 14 is in its "BREATH" position, then as the pressure builds up to the desired amount, the pressure switch 100 is closed. This actuates the counter 101, which then counts up to approximately eleven seconds or such other period as is desired. The idea is to provide the time necessary for a full alveolar breath. At the end of this delay period the counter 101 activates the device 102 which then locks the digital display 18 to its reading and activates the decade pulser 70, so that the decades 63, 64, and 65 are enabled to rotate to their proper positions; then, when the one-second delay is completed, the pulse for the printer solenoid is generated in the print pulse generator 103 and sent to the print pulser 72.

The same operational sequence of the print enable switch 73 is repeated in the "AIR BLANK" and the "CALIBRATION" positions of the function switch 14, but in this instance the units 100 and 101 do not come into play. Instead, the pump circuit 104 provides the same kind of signal that is provided from the counter 101 when the function switch 14 is in the "BREATH" position. The pump circuit 104 includes an air pump and a time delay mechanism which drives the air pump for approximately 35 seconds and, at the end of that time, activates the one-second delay and logic device 102. Then the sequence described above commences in the same way.

The automatic print enable 73 also includes a disabling function provided by two types of operator errors. If the function switch 14 is in any of the positions at the right, namely the "AIR BLANK," "BREATH," and "CALIBRATION" positions and if while the switch 14 is in that position, the operator pushes down on the zero adjust knob 15, then the switch 107 which is connected to the zero adjust knob 15 at this particular time, that is through a part of the circuit for the switch 14, closes and actuates the flip-flop 105 to its error mode, which inhibits the print pulse generator 103 so that the printer 20 will not print.

The other error that will prevent printing is failure to adjust properly to zero. When the function switch 14 is in its "zero set" position and the instrument is not adjusted to zero or approximately to zero, the device is set so that it will not cause an error signal on a reading of either 000, 001, 002, or 003, but in all other positions an error signal will indicate that the zero adjustment has not been done properly. The information from this is obtained from the digital interface 62 and, by well-known means, is sent from the digital interface 62 to the gating function circuit 106 which analyzes that information. If the operator has made the mistake mentioned, then the flip-flop 105 is activated to its error mode, and the print pulse cannot be generated by the generator 103, so the device 20 will not print.

OPERATING PROCEDURE:

When the instrument is plugged into line, with a grounded outlet, the "on/off" toggle switch 11 is moved into the up or "on" position, and the lamp 12 is lighted. Soon, the "ready" light 13 comes on, and a test may then be conducted. As in any breath-testing device, the subject must not be tested for fifteen minutes following his last drink; state laws generally require a fifteen-minute period during which the subject cannot eat, drink or smoke.

The card 21 is inserted into the card slot 22. Printed on the back of the card 21 may be the words "This side up and facing operator." The card 21 is slid slowly and carefully down in the slot 22 until it hits bottom. In this position, the first printing of any data appears in the lowest box on the face of the card 21. After a printing, the card 21 is automatically advanced to the next position, so that the second printing takes place in the box above.

The mode selector knob 14 is rotated to the "Zero Set" mode and the operator pushes down on the zero adjust knob 15 and rotates it until the digital panel meter reads 0.00 percent alcohol in blood. If the zero adjust knob 14 is rotated too far clockwise, a false positive reading will appear and the zero adjust knob 14 will have to be rotated counterclockwise to bring it back to a reading of 0.00. If the knob 14 is turned too far counterclockwise, the 0.00 reading will begin to flash on and off, and a counterclockwise adjustment must be made. There is preferably an interlock in the knob 14 so that the knob 14 must be pressed down gently as it is rotated to affect the panel meter reading.

Once the reading is electronically set at 0.00 percent alcohol in blood, the mode selector knob 14 can be rotated to the "Air Blank" mode. When this is done, the sound of the pump 49 can be heard humming as it fills the breath sample cell 25 with ambient room air. At the end of 35 seconds the pump 49 turns off automatically, and the printer prints the percent alcohol in blood reading automatically. It should read 0.00 at this time.

The mode selector knob 14 can then be rotated into the "BREATH" mode position, and a test of the subject's breath taken. The breathing tube 24 is pulled out of the right side of the device, the tube 24 being kept retracted in the instrument when not in use, in order to keep it warm. The tube 24 may be long enough, e.g., 36", to permit the subject to sit behind the instrument 10, so that he cannot see the face of the instrument and the percent alcohol in blood reading, if this is desired. One of the disposable sanitary plastic mouthpieces 26 is placed into the breath tube 24 and given to the subject to deliver his breath sample. It is essential that the subject deliver an alveolar or deep-lung sample. This is the latter part of deeply expired breath, since the first portion of the breath represents air that was held in the mouth, windpipe and bronchial tubes. Only the air in the alveoli of the lungs is in true equilibrium with pulmonary blood. Fortunately, the device 10 can easily assure a deep-lung sample. Unlike chemical tests for breath alcohol, the amount of breath captured is not important, only the concentration. As the subject's breath begins to fill the sample cell, the meter 18 which reads percent alcohol in blood begins to show a rising blood alcohol value. It is a real time reading with no lag. When the subject's breath has replaced all of the ambient air in the cell 25, the meter 18 indicates a maximum reading, and it remains at that reading despite the fact that the subject continues to exhale. This indicates the maximum alcohol concentration has been reached and that replacing further breath at maximum concentration will not alter the reading.

A subject may attempt to fool the instrument by providing shallow breaths which contain some upper lung and mouth air, and would, therefore, give a low reading compared with a blood sample. This may be avoided by watching the breath pressure indicator 23, a green indicator lamp that turns on only when adequate breath pressure is being applied. If this indicator lamp 23 is kept on by the breath until the cycle-complete indicator lamp turns on (approximately 11 seconds), one can be quite sure that the sample taken is an alveolar or deep long sample.

If the operator wishes to take a second or third breath test, or take an equilibrator standard reading for calibration purposes, he first turns the mode selector switch 14 back to the "air blank" mode to purge the cell 25 of the last breath sample. When the cell 25 has been purged and the meter 18 again reads 0.00 percent alcohol in blood, he can then switch the mode selector knob 14 back to the breath or calibrator mode.

If, during the course of a set of readings, the zero set knob 15 is depressed, possibly altering the zero and, therefore, any subsequent readings, two events will take place. First, the error lamp 16 will light up and the printer will be unable to print any further information until the zero set knob 15 is again zeroed. This tamper-proof feature protects both the subject and operator from erroneous results.

The device 10 can be calibrated with any of the commercially available equilibrators.

TESTING:

The instrument described has been reduced to practice and tested by knowledgeable law enforcement personnel.

Extensive laboratory tests have been carried out using equilibrator instruments which produce alcohol vapors equivalent to the breath of individuals with blood alcohol concentrations from 0.005 percent to 0.5 percent. Over this entire range, the Lambert-Beer Law has been shown to be a valid relationship. FIG. 1.0 is typical of a run of equilibrator tests. Equilibrator output is determined by calculation based on concentration of alcohol-water solutions and the temperature of equilibration above the liquid.

On several occasions, testing with volunteer drinkers has provided sufficient data to allow statistical analysis.

The present invention can also be employed to determine alcohol, ketone or aldehyde content of liquid samples by first totally vaporizing a sample of the liquid, introducing the vapor after freeing it of water vapor, into the sample receptacle and proceeding as described above, selecting the wavelength of energy at maximum or desirable absorption for each, e.g., 3.39 microns for alcohol; 5.57, 4.76 or 3.36 for acetone; 3.39 for aldehyde. Also, the device can be used as described above to determine acetone in the breath of a diabetic person; and it can be useful to determine immediately methane content in mine gases or ascertain hydrocarbon automobile exhaust pollutant level in the atmosphere. Monitoring of anesthetic gases during surgery is also possible.

TEST I:

This test was performed with volunteer drinkers, who were repeatedly tested during the course of declining blood alcohol concentrations, on the device of the invention and also on a prior-art well-known type of breath analyzer.

Data from this test is shown in Table A.

Table A - Percent Blood Alcohol

| Subject | Time | This invention | Prior Art Breath Analyzer | Difference |
|---|---|---|---|---|
| I | 9:40 a.m. | 0 | 0 | 0 |
| II | 9:45 | 0 | 0 | 0 |
| III | 9:50 | 0 | 0 | 0 |
| I | 10:45 a.m. | .061 | .060 | + .001 |
| (3 oz.) | 11:00 | .056 | .051 | + .005 |
| | 11:20 | .049 | .049 | .000 |
| | 11:40 | .032 | .039 | − .007 |
| | 12:00 p.m. | .026 | .029 | − .003 |
| | 12.30 | .020 | .021 | − .001 |
| | 12.50 | .013 | .014 | − .001 |
| II | 11:00 a.m. | .068 | .068 | .000 |
| (3 oz.) | 11:25 | .046 | .046 | .000 |
| | 11:50 | .031 | .034 | − .003 |
| | 12:10 p.m. | .039 | | |
| | 12:15 | .038 | .037 | + .001 |
| | 12:40 | .026 | .029 | − .003 |
| | 1:05 | .022 | .020 | + .002 |
| | 1:30 | .014 | .017 | − .003 |
| | 2:30 | .006 | | |
| III | 11:15 a.m. | .150 | .134 | + .016 |
| (6 oz.) | 11:30 | .124 | .123 | + .001 |
| | 11:53 | .117 | .110 | + .007 |
| | 12:17 p.m. | .081 | .080 | + .001 |
| | 12:55 | .068 | .068 | .000 |
| | 1:10 | .064 | .064 | .000 |
| | 1:35 | .054 | .057 | − .003 |
| | 2:20 | .048 | | |
| Police | | .145 | .144 | + .001 |
| Equilibrator | | .146 | .145 | + .001 |

TEST II

In this test, a single drinker (IV) who achieved a peak blood alcohol level of about 0.08 percent was tested repeatedly on both a police prior-art breath analyzer and the device of this invention.

The readings from this invention were taken as triplicates, to show their reproducibility.

Data from this test are listed in Table B.

Table B - Percent Blood Alcohol

| Time | Subject | Prior Art Breath Analyzer | This Invention |
|---|---|---|---|
| 10:00 a.m. | Equilibrator | 0.140 | 0.1395 |
| | | | 0.1415 |
| | | | 0.1415 |
| 10:10 | IV | 0.078 | 0.080 |
| | | | 0.081 |
| | | | 0.081 |
| 10:45 | IV | 0.077 | 0.074 |
| | | | 0.078 |
| | | | 0.078 |
| 11:15 | IV | 0.0615 | 0.060 |
| | | | 0.062 |
| | | | 0.058 |
| 11:50 | IV | 0.0515 | 0.051 |
| | | | 0.049 |
| | | | 0.053 |
| 11:55 | Equilibrator | 0.140 | 0.139 |
| | | | 0.1415 |
| 12:30 p.m. | IV | 0.045 | 0.034 |
| | | | 0.034 |
| | | | 0.032 |
| 1:00 | IV | 0.036 | 0.026 |
| | | | 0.0315 |
| | | | 0.0315 |
| | | | 0.0315 |
| 1:30 | IV | 0.021 | 0.014 |
| | | | 0.014 |
| | | | 0.016 |
| 2:00 | IV | 0.01 | 0.004 |
| | | | 0.008 |

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

Having now described the invention, what is claimed is:

1. A system for determining the amount of an organic compound containing carbon and hydrogen and having a substantial vapor pressure at not over 100° C. and being present in a gaseous mixture substantially free of moisture vapor, including in combination:
    a. a source of highly stable radiant energy in the near infrared range and of predetermined wavelength,
    b. means for modulating said energy to a fixed modulation frequency,
    c. means to collimate and direct a beam of said energy along a desired path,
    d. a receptacle adapted to contain an amount of vapor to be tested for such amount of compound and having ingress and egress means for said beam of said directed energy,
    e. means for providing a fixed-length path traveled by said beam between said ingress and egress means, said path in itself imparting no loss in said energy, so that energy loss along said path is due solely to the presence of said compound,
    f. means to introduce a gaseous mixture into said receptacle,
    g. a radiation detector in the path of said beam at said egress means to initiate an electrical signal,
    h. means to amplify and process said electrical signal,
    i. means for electronically filtering said signal in a narrow band centered at said modulation frequency, and
    j. means to display the filtered, amplified and processed said signal as an expression of the amount of said compound in said mixture.

2. The system of claim 1 wherein said radiation detector is a solid state photoconductive radiation transducer.

3. The system of claim 1 wherein said means to amplify and process said signal comprises analogue-to-digital converter means for converting the amplified signal to digital format, and said means to display said signal displays it in digital format.

4. The system of claim 1 wherein said fixed path comprises a series of spherical segment mirrors in said receptacle, which refocus each reflection of said beam and thereby prevent light losses.

5. The system of claim 1 wherein said modulating means comprises a rotating apertured disk and means for rotating said disk at a fixed frequency.

6. The system of claim 1 having means for maintaining the interior of said receptacle at a fixed predetermined temperature.

7. The system of claim 1 having means for deactivating operation unless the appropriate operating steps have been properly taken.

8. The system of claim 1 wherein said gas mixture is human breath.

9. The system of claim 1 wherein said organic compound is ethanol.

10. The system of claim 1 wherein said source of energy is a helium neon laser with a wavelength of 3.39 microns.

11. The system of claim 1 wherein said source of energy is a quartz halogen lamp in combination with infrared filter means for resolving the wavelength regions of interest.

12. The system of claim 1 wherein there is provided a means to purge said receptacle of said gaseous mixture after testing.

13. The system of claim 1 wherein said organic compound is acetone.

14. The system of claim 1 wherein said organic compound is chosen from the group of anesthetics consisting of ether, haldane, chloroform, and cyclohexone.

15. The system of claim 1 wherein said organic compound is methane and said gaseous mixture is mine gas atmosphere.

16. The system of claim 1 wherein means is provided to dehydrate said gas mixture before it is introduced into said receptacle.

17. A system for determining the amount of an organic compound containing carbon and hydrogen and having a substantial vapor pressure at not over 100° C. and being present in a gaseous mixture substantially free of moisture vapor, including in combination:
    a. a source of radiant energy rich in the near infrared range,
    b. modulating means for imparting a fixed modulation frequency to said energy,
    c. means to collimate and direct said energy along a desired path, d. a receptacle adapted to contain an amount of vapor to be tested for such amount of compound and having ingress and egress means for a beam of said directed energy, e. means to introduce a gaseous mixture into said receptacle, f. means for providing a fixed-length path traveled by said beam between said imgress and egress means, said path in itself imparting no loss in said energy, so that energy loss along said path is due solely to the presence of said compound, g. an interference filter at said egress through which said beam passes in a narrow preselected band matching a strong absorption band of said organic compound, h. a radiation detector in the path of said beam after it passes through said interference filter for initiating an electrical signal from said beam, i. means to amplify and process said electrical signal, j. means for filtering said signal electronically in a narrow band centered at said modulation frequency, and k. means to display the amplified, processed and filtered said signal as an expression of the amount of said compound in said mixture.

18. The system of claim 17 wherein said detector is a solid state photoconductive radiation transducer.

19. The system of claim 17 wherein said means to amplify and process said signal includes analogue-to-digital converter means for converting the amplified signal to digital format, and wherein said means to display said signal displays it in digital format.

20. A method for determining the amount of an organic compound containing carbon and hydrogen and having a substantial vapor pressure at not over 100° C. and being present in a gaseous mixture substantially free of moisture vapor, including in combination:

a. generating highly stable radiant energy in the near infrared range and of predetermined wavelength, b. modulating said energy to a fixed modulation frequency, c. collimating said energy into a beam and directing said beam along a desired path, d. passing said beam into and out from a receptacle adapted to contain an amount of vapor to be tested for such amount of compound, said beam traveling a fixed-length path in said receptacle, e. preventing loss in said energy in said receptacle except losses due solely to the presence of said compound, f. introducing said gaseous mixture into said receptacle, g. initiating an electrical signal from said beam when it leaves said receptacle, h. amplifying and processing said signal, i. filtering said signal electronically in a narrow band centered at said modulation frequency, and j. displaying the amplified, filtered, and processed said signal as a fraction of the amount of said compound in said gaseous mixture.

* * * * *

REEXAMINATION CERTIFICATE (533rd)

United States Patent [19]

Harte et al.

[11] B1 3,792,272

[45] Certificate Issued  Jul. 22, 1986

[54] BREATH TEST DEVICE FOR ORGANIC COMPONENTS, INCLUDING ALCOHOL

[75] Inventors: Richard A. Harte, Redwood City; Edwin A. Amstutz, Santa Clara; Achille M. Bigliardi, III, San Jose; William M. Johnson, Palo Alto, all of Calif.

[73] Assignee: CMI Inc., Minturn, Colo.

Reexamination Request:
No. 90/000,791, May 31, 1985

Reexamination Certificate for:
Patent No.: 3,792,272
Issued: Feb. 12, 1974
Appl. No.: 323,295
Filed: Jan. 12, 1973

Related U.S. Application Data

[63] Continuation-in-part of Ser. No. 212,522, Dec. 27, 1971, abandoned.

[51] Int. Cl.[4] ............................................ G01N 21/63
[52] U.S. Cl. ................................. 250/343; 250/338; 250/339; 250/340; 356/51; 356/437
[58] Field of Search .............. 250/343, 338, 339, 340

[56] References Cited

U.S. PATENT DOCUMENTS

| | | | |
|---|---|---|---|
| 2,817,769 | 12/1957 | Siegler, Jr. et al. | 250/220 |
| 3,218,914 | 11/1965 | Bartz et al. | 88/14 |
| 3,281,595 | 10/1966 | Rusz | 250/43.5 |
| 3,443,217 | 5/1969 | Brinkerhoff | 324/58.5 |
| 3,562,524 | 2/1971 | Moore | 250/43.5 |
| 3,564,237 | 2/1971 | Takeuchi et al. | 250/43.5 |
| 3,678,262 | 7/1972 | Herrmann | 250/43.5 |
| 3,700,890 | 10/1972 | Kruezer | 250/43.5 |

FOREIGN PATENT DOCUMENTS

1113986  5/1968  United Kingdom.

*Primary Examiner*—B. C. Anderson

[57] ABSTRACT

A system for detecting volatile components in a vapor, e.g., alcohol, in the breath of a human subject. A ray of frequency-modulated and collimated light of suitable near infrared wavelength from a source such as a laser or a quartz-halogen lamp, collimated with quartz lenses and appropriate optical interference filters passes through the vapor sample via a path of fixed length and free from light losses except those caused by the volatile components being detected, and strikes a radiant energy detector, setting up an electrical signal which is amplified, electronically processed, filtered, and displayed. The concentration of alcohol or other test vapor affects the amount of energy able to pass through the sample to the detector. The detector determines the energy absorbed by the sample and transmits the result to a readout device, meter, or permanent recording means. The sample can be collected by taking an alveolar (deep lung) sample of the subject's breath. The system determines, through Henry's law, the blood content of alcohol, ketones, aldehydes, various anesthesias and the like. This system is also applicable to determine combustible gases, for example, in coal mines.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–20 are cancelled.

New claims 21–23 are added and determined to be patentable.

*21. A system for determining the amount of an organic compound containing carbon and hydrogen and having a substantial vapor pressure at not over 100° C. and being present in human breath, including in combination:*

*a source of highly stable radiant energy in the near infrared range and of predetermined wavelength;*

*means for modulating said energy to a fixed modulation frequency;*

*means to collimate and direct a beam of said energy along a desired path;*

*a receptacle open to ambient air and adapted to contain an amount of vapor to be tested for such amount of compound and having ingress and egress means for said beam of said directed energy;*

*an air pump for aiding in evacuating the organic compound from the receptacle by pumping ambient air into the receptacle;*

*mirror means for providing a folded, fixed-length path traveled by said beam between said ingress and egress means, said path in itself imparting no loss in said energy, so that energy loss along said path is due solely to the presence of said compound;*

*heater means and thermostat means for maintaining the interior of said receptacle at a fixed predetermined temperature above breath temperature, to prevent breath moisture condensation and to prevent loss of said organic compound in the condensate;*

*means for indicating that said fixed predetermined temperature has been reached;*

*a breath tube to introduce the breath into said receptacle;*

*means for insuring that a deep lung sample is provided;*

*means for indicating that an adequate breath pressure is being applied;*

*means for heating said breath tube;*

*a radiation detector in the path of said beam and said egress means to initiate an electrical signal;*

*means to amplify and process said electrical signal;*

*means for electrically filtering said signal in a narrow band centered at said modulation frequency;*

*digital readout means for providing a digital readout of the filtered, amplified and processed signal as an expression of the amount of said compound in said breath; and*

*a printer responsive to said processed signal for printing information concerning the amount of said compound.*

*22. A system as described in claim 23, in which said modulating means provides a fixed modulation frequency that is not a multiple of line current frequency; in which said means for indicating that said fixed predetermined temperature has been reached comprises the activation of a ready light; in which said insuring means includes a meter and timer; and in which said means for indicating that an adequate breath pressure is being applied includes an indicator lamp that is activated only when adequate breath pressure is being applied.*

*23. A method for determining the amount of an organic compound containing carbon and hydrogen and having a substantial vapor pressure at not over 100° C. and being present in human breath, including in combination:*

*generating highly stable radiant energy in the near infrared range and of predetermined wavelength;*

*modulating said energy to a fixed modulation frequency;*

*collimating and directing a beam of said energy along a desired path;*

*passing said beam into and out from a receptacle open to ambient air and adapted to contain an amount of vapor to be tested for such amount of compound, said beam traveling a folded, fixed-length path in said receptacle;*

*evacuating the organic compound from the receptacle by pumping ambient air into the receptacle;*

*preventing loss in said energy in said receptacle except losses due solely to the presence of said compound;*

*maintaining the interior of said receptacle at a fixed predetermined temperature above breath temperature, to prevent breath moisture condensation and to prevent loss of said organic compound in the condensate;*

*indicating that said fixed predetermined temperature has been reached;*

*introducing the breath into said receptacle by means of a breath tube;*

*providing means for insuring that a deep lung sample is provided;*

*providing means for indicating that an adequate breath pressure is being applied;*

*providing means for heating said breath tube;*

*initiating an electrical signal from said beam when it leaves said receptacle;*

*amplifying and processing said signal;*

*filtering said signal electronically in a narrow band centered at said modulation frequency;*

*digitally displaying the amplified, filtered and processed said signal as a fraction of the amount of said compound in said breath; and*

*providing a printout, responsive to said processed signal, concerning the amount of the organic compound.*

* * * * *